Nov. 26, 1935.      C. H. BRADLEY      2,022,272
IDLER ROLLER SUPPORTING MEANS FOR BELT CONVEYERS
Filed Sept. 17, 1934      2 Sheets-Sheet 1

INVENTOR
CHARLES H. BRADLEY.
BY
ATTORNEY

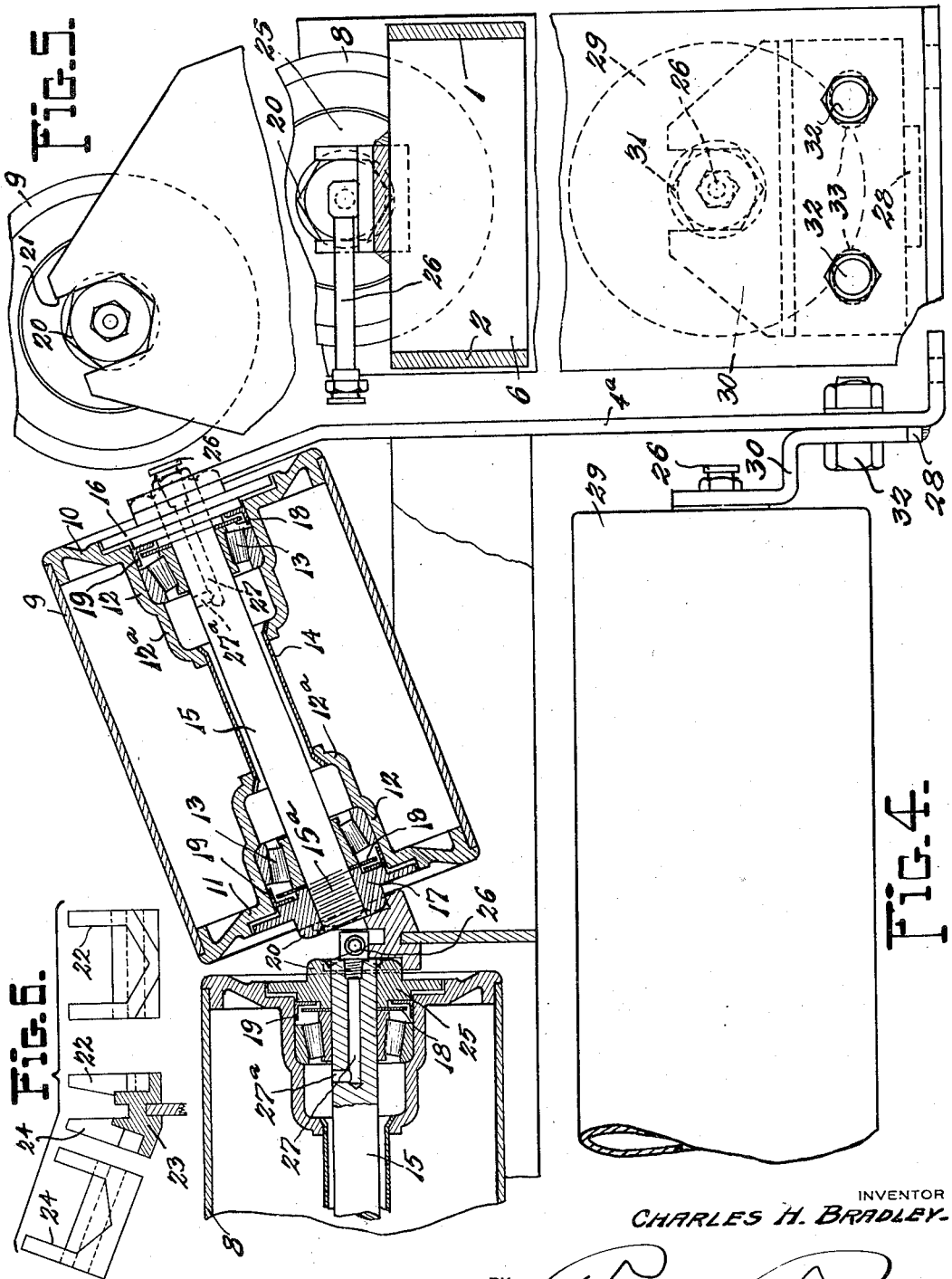

Patented Nov. 26, 1935

2,022,272

UNITED STATES PATENT OFFICE 2,022,272

IDLER ROLLER SUPPORTING MEANS FOR BELT CONVEYERS

Charles H. Bradley, Cleveland Heights, Ohio

Application September 17, 1934, Serial No. 744,437

6 Claims. (Cl. 198—192)

This invention appertains to the art of endless belt conveyers, and embodies particularly certain improvements in the means utilized for supporting the idler rollers of such conveyers.

In carrying out my invention an especial object in view has been to provide a mounting support for such rollers, which is of simple compact construction, and possesses a substantial degree of rigidity in respect to the elements thereof on which the rollers are directly carried; to so design said support that the strains or stresses transmitted by the loaded conveyer belt are adequately resisted, and so received by the support as to incur practically no likelihood of breakage or loosening of the parts on which the troughing and/or training rollers of the conveyer are mainly carried; to provide certain special interlocking features between the roller shafts and supporting saddle members, standards, and brackets that engage the roller heads or unit members carried thereby, and to provide other novel details of construction suitable to the purposes of the invention.

With the foregoing outline of the novel features of my invention in mind, more specifically speaking, there is provided a cradle mounting unit for the idler rollers especially advantageous in affording a compact assemblage of the rollers, holding the latter quite rigidly, and itself made of an assemblage of bar and plate shapes conducive to cheapness of manufacture, but sacrificing in no way the strength required in supports of the nature of the invention. In fact, if anything, such strength is materially increased and the center of gravity of the belt and its load lowered relatively to the supporting means therefor.

A novel combination single cradle mounting unit for conjointly and contiguously supporting both the troughing and training rollers of the conveyer is a feature of this invention, along with special provisions for accurate adjustment of the training roller.

Peculiar saddle and standard members, forming parts of the cradle mounting unit and engageable with poly-sided extensions of cap members on the roller heads, to hold the roller shafts against rotation, are novel features of my invention.

Additionally, a novel formation of housing members for anti-friction bearings of the idler rollers, so designed as to afford lubricating chambers, one directly associated with each said bearing to supply lubricant thereto, is a provision of the formation of the heads of the rollers for facilitating proper lubrication facilities therefor.

A full understanding of the foregoing improvements will be had upon reference to the accompanying drawings in which—

Figure 3:
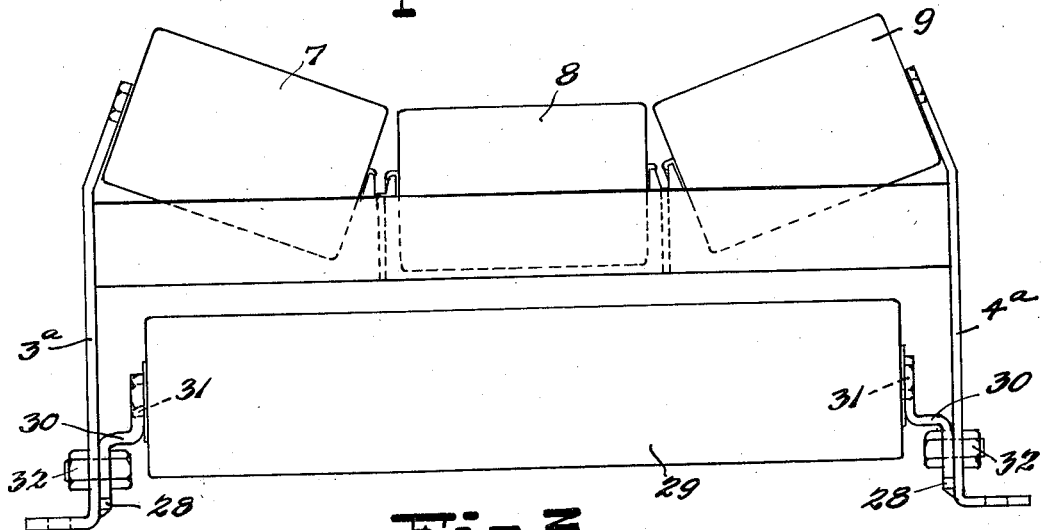
Figure 3 is a view similar to Figure 2 but showing the construction of the cradle mounting as when formed to accommodate for carrying upon its end standards the sub-standards in which a training roller for the lower lap of the conveyer belt is carried.

Figure 4 is an enlarged view in front elevation, partially broken away and showing more clearly the parts that are illustrated in Figure 3, the troughing rollers to the extent that they are illustrated being shown in section, and the saddle members carried by one of the cross members of the cradle being also shown in section and supporting the adjacent ends of the troughing rollers, and the portion of the training roller illustrated being in elevation.

Figure 5 is a combination view showing the mounting means for the training roller by end view illustration largely depicting the same in dotted lines, showing the mounting of the saddle members upon the cross plates or members of the cradle at the middle portion of the view and showing at the top of the view the manner in which the upper ends of the end standards of the cradle interlock with the heads of the outer or end troughing rollers.

Figure 6 is a combination view of one of the saddle members, including an end elevation thereof at the left of the view, a vertical sectional view thereof at the middle of the view, as joined to its supporting cross member of the cradle, and providing an opposite end view thereof at the right of the figure.

Figure 1:
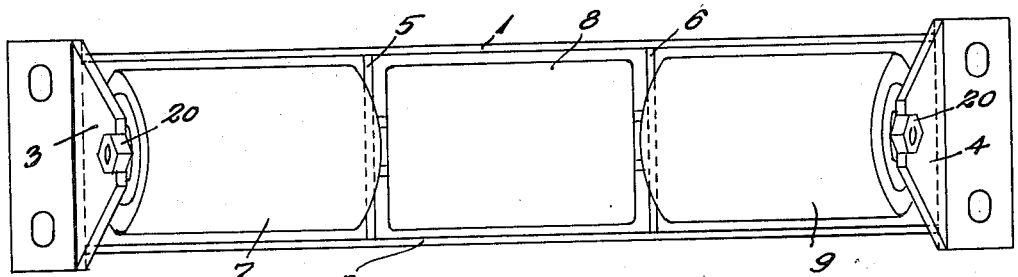
Figure 1 is a top plan view showing a complete cradle mounting such as utilized to support the troughing rollers of a conveyer belt, said rollers disposed in operative positions in said mounting.
Figure 2:
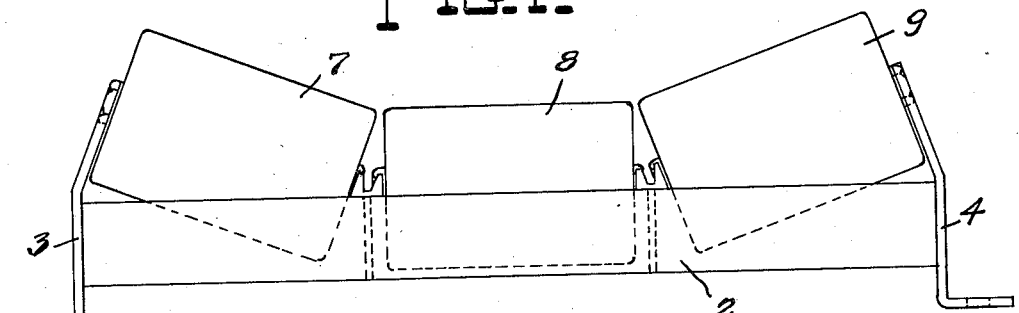
Figure 2 is a front elevation of the same.

Referring to Figures 1 and 2 of the drawings, the very simple construction of my cradle mounting means may be described as comprising a cradle or body including the spaced sides 1 and 2, the end members or standards 3 and 4, and the cross plates or members 5 and 6 which span the space between the side members 1 and 2 and virtually form connecting webs intermediate said parts. The cross members 5 and 6, the side members 1 and 2, and the end members or standards 3 and 4 are made up from bar and plate shapes and are joined together by welding at the contacting portions, thus providing an assembly unit which is rigid and which truly forms a cradle-like support on which the troughing rollers are mounted and in which they are partially received as shown in Figure 2. The troughing rollers are designated 7, 8, and 9, the outer ends of the outer rollers 7 and 9 being carried by the end standards 3 and 4 and the inner ends of said rollers being supported on the intermediate cross members previously referred to. The central or intermediate troughing roller 8 is carried upon the cross members 5 and 6 only. It will be apparent that by reason of the formation and connection of the side members 1 and 2 with the end standards 3 and 4, the said standards are reinforced and rendered more rigid thereby. The construction is very strong and will withstand readily on this account all of the stresses and strains incident to the transmission on the belt conveyer running over the troughing rollers of very heavy loads such as these conveyers are often required to carry in many types of mills.

In order to set forth the manner in which the rollers 7 and 8 and 9 are mounted in connection with the parts supporting them, reference is made to Figure 4 for an understanding of the construction of said rollers. Generally speaking, each of the rollers 7, 8 and 9 is of the same form and so the description of the roller 9 as now set forth will be equally applicable to the other rollers 7 and 8. The roller 9 is equipped with an outer head 10 and an inner head 11. These heads are formed with hollow members in the form of housings 12 for the anti-friction bearings 13 mounted therein and the said housings 12 are provided with hollow extensions 12a forming grease or lubricant chambers, one of such chambers being associated with each anti-friction bearing and the two chambers being connected by a cylindrical member or sleeve 14 swaged or otherwise attached thereto and surrounding the axis or shaft 15 about which the roller turns. The sleeve member 14 is of a diameter slightly greater than the diameter of the shaft 15, and this being true the lubricant chambers provided by the housing extensions 12a are adapted readily to retain the lubricant or grease disposed therein and feed it to the adjacent anti-friction bearings.

In addition to the heads 10 and 11 the roller 9 is equipped with an outer cap plate 16 and an inner cap plate 17. The outer cap plate 16 is rigidly attached to the shaft 15 by being tightly fitted therein so as not to permit turning of the latter relatively to said plate 16. Each of the cap plates 16 and 17 in effect provides a grease seal for the compartment receiving the anti-friction bearings 13, and a suitable flat grease ring 18 and a sealing cup 19 may be interposed between the anti-friction bearing and the inner side of each said cap plates or members 16 or 17. The cap plate or member 17 of the roller is intended to be rotatable relatively to the shaft 15 being provided with internal screw threads to screw upon the screw portion 15a of said shaft 15. In the above way it will be apparent that with the roller 9 equipped with its heads 10 and 11 the shaft 15 may be quickly assembled by being axially disposed within the parts 12, 12a and 14, the cap plate or member 16 rigid on the shaft. Then the cap plate 17 may be screwed upon the inner end of the shaft 15, it being assumed of course that the anti-friction bearings are in place before the shaft 15 is applied in the above manner. Thus the assembly of the parts of the roller will be complete.

Each of the cap plates or members 16 or 17 is equipped with a poly-sided extension or nut member designated 20, and in respect to the rollers 7 and 9 the nut members 20 of the outer cap plates 16 are adapted to be received in the interlocking slots 21 of the standards 3 and 4 respectively, the said slots 21 being formed at the upper ends of said standards and being open. In like manner the nut or many-sided extensions 20 at the inner ends of the rollers 7 and 9 are designed to fit in somewhat U-shaped many-sided sockets 22 of saddle members 23 which are carried at the upper portions of the cross members 5 and 6. The saddle members 23 are not only equipped at one side with the sockets 22 but similar sockets 24 are provided at their other sides, the sockets 24 adapted to receive the nut extensions 20 of the cap plates 25 with which the opposite ends of the roller 8 are equipped, said cap plates 25 having the characteristic constructions of the two cap plates 16 and 17 employed for the rollers 7 and 9.

Suitable lubricant supply fittings 26 may be used in conjunction with accessible ends of shaft 15 of the rollers 7, 8 and 9 and the lubricant will be supplied through lubricant passages 27 in the end of the shafts, said passages 27 having lateral portions 27a to conduct the lubricant to the chambers provided by the extension 12a of the housing members 12 for the anti-friction bearings.

The details of the construction of the rollers 7 and 9 being evident, the manner in which the rollers are assembled upon and within the cradle comprising the sides 2, end standards 3 and 4, and cross members 5 and 6 will be obvious from the foregoing.

It suffices to state, as is well shown in Figures 3 to 5 inclusive, that when a training roller for the return or lower lap of the conveyer belt is to be mounted adjacent to a series of the troughing rollers as shown in Figure 2, I contemplate using vertically elongated end standards 3a and 4a in substitution for the standards 3 and 4 previously described. These standards 3a and 4a will be equipped at their lower portions with inwardly projecting ribs or ledges 28 welded at the inner sides of said standards. The training roller now to form a part of the cradle mounting unit assembly is designated 29 and is carried by sub-standards or brackets 30, see Figures 3 and 4, said standards 30 being formed at their upper ends with many-sided slots to receive the many-sided extensions or nut members 31 on the end heads of the roller 29. Intermediate their ends the sub-standards 30 are connected to the standards 3a and 4a by suitable nuts and bolts indicated at 32, the bolts of the connections 32 passing through horizontally elongated slots 33 in the sub-standards or brackets 30 whereby to permit of slight horizontal adjustment of these parts along the ledges or ribs 28. This is a highly desirable construction because it is essential that the disposition of the roller 29 be accurately at a right angle or perpendicular to the line of movement of the conveyer belt, and the adjustability of the parts 30 by reason of the connection 32 permits the above accurate adjustment of the roller 29, and the ribs or ledges 28 by reason of having accurate line contacts with the parts 30 adequately provide for facilitating the accurate adjustment of the parts 30 for proper supporting of the training roller 29 carried thereon.

The cap members 16 and 17 afford extra grease or lubricant seals for the bearing chambers as quite apparent, supplementing the parts 8 and 12 in this capacity.

Having thus described my invention, what I claim as new and desire to secure by Letters Patent of the United States, is—

1. In roller supporting means for belt conveyers, the combination of a pair of spaced sides having the form of relatively flat, thin bars of substantial depth, end standards spanning the distance between the side bars at the ends thereof and having the form of relatively flat, thin plates rigidly united to the side bars, web-like cross plates interposed between the side bars at intervals in their length, said cross plates being of substantially the same depth as the side bars and having their lateral edges rigidly united therewith, and said cross plates and end standards having means at their upper edges for mounting a plurality of rollers in endwise disposed relation to each other.

2. In roller supporting means for belt conveyers, the combination of a series of endwise disposed rollers, and a mounting cradle for said rollers, said cradle including spaced sides between which the rollers are received, cross members connecting said sides, end standards connecting said sides, brackets carried by said standards below said rollers, a training roller on said brackets, and instrumentalities to permit adjustment of the brackets for ensuring proper rectilinear disposition of the last roller relatively to a belt traveling thereover.

3. In roller supporting means for belt conveyers, the combination of a series of endwise disposed rollers, and a mounting cradle for said rollers, said cradle including spaced sides between which the rollers are received, cross members connecting said sides, end standards connecting said sides, brackets carried by said standards below said rollers, a training roller on said brackets, instrumentalities to permit adjustment of the brackets for ensuring proper rectilinear disposition of the last roller relatively to a belt traveling thereover, and ledges on the standards coacting to hold the brackets and direct the adjustment thereof in coaction with the adjusting instrumentalities.

4. In roller supporting means for belt conveyers, the combination of a series of endwise disposed rollers, and a mounting cradle for said rollers, said cradle including spaced sides between which the rollers are received, cross members connecting said sides, end standards connecting said sides, brackets carried by said standards below said rollers, a training roller on said brackets, instrumentalities to permit adjustment of the brackets for ensuring proper rectilinear disposition of the last roller relatively to a belt traveling thereover, and ledges on the standards coacting to hold the brackets and direct the adjustment thereof in coaction with the adjusting instrumentalities, the lower edges of the brackets being engaged with and aligned with said ledges, and the adjusting instrumentalities comprising fastenings adjustably securing the brackets to the standards as set forth.

5. A mounting cradle for troughing and training rollers of belt conveyers comprising spaced sides, cross connecting members between the sides intermediate their ends, and end standards, together with training rollers supporting brackets carried by the standards below said spaced sides.

6. A mounting cradle for troughing and training rollers of belt conveyers comprising spaced sides, cross connecting members between the sides intermediate their ends, and end standards, together with training roller supporting brackets carried by the standards below said spaced sides, members permitting adjustment of the brackets, and saddle members on the upper edges of the cross members, the upper portions of the standards and said saddle members having sockets to receive and support members carrying the rollers.

CHARLES H. BRADLEY.